(12) United States Patent
Rampana et al.

(10) Patent No.: US 8,640,753 B2
(45) Date of Patent: Feb. 4, 2014

(54) TIRE HAVING A STRUCTURAL ELEMENT REINFORCED WITH A HYBRID YARN

(75) Inventors: Barbara Rampana, Milan (IT); Diego Tirelli, Milan (IT); Udo Kuhlmann, Dresden (DE); Chokri Cherif, Dresden (DE); Christian Paul, Dresden (DE); Refah Ahmet Torun, Dresden (DE); Olaf Diestel, Dresden (DE)

(73) Assignee: Pirelli Tyre S.p.A., Milan (IT)

( * ) Notice: Subject to any disclaimer, the term of this patent is extended or adjusted under 35 U.S.C. 154(b) by 539 days.

(21) Appl. No.: 12/739,693

(22) PCT Filed: Oct. 24, 2007

(86) PCT No.: PCT/EP2007/009221
§ 371 (c)(1),
(2), (4) Date: Apr. 23, 2010

(87) PCT Pub. No.: WO2009/052844
PCT Pub. Date: Apr. 30, 2009

(65) Prior Publication Data
US 2010/0224298 A1 Sep. 9, 2010

(51) Int. Cl.
*B60C 9/00* (2006.01)
*B60C 9/18* (2006.01)

(52) U.S. Cl.
USPC .......................................... 152/451; 152/526

(58) Field of Classification Search
USPC ................................................. 152/451, 526
See application file for complete search history.

(56) References Cited

U.S. PATENT DOCUMENTS

| 3,438,186 A | * | 4/1969 | Marshall | 57/6 |
| 3,538,702 A | * | 11/1970 | Wolf et al. | 57/218 |
| 4,152,886 A | * | 5/1979 | Nelson | 57/208 |
| 4,244,171 A | * | 1/1981 | Sasaki et al. | 57/208 |
| 4,244,173 A | * | 1/1981 | Lulay | 57/227 |

(Continued)

FOREIGN PATENT DOCUMENTS

| EP | 0 335 588 A2 | 10/1989 |
| EP | 0 661 179 A1 | 7/1995 |

(Continued)

OTHER PUBLICATIONS

European Search Report for International Application No. PCT/EP2007/009221, mailing date Jul. 29, 2008.

(Continued)

*Primary Examiner* — Justin Fischer
(74) *Attorney, Agent, or Firm* — Finnegan, Henderson, Farabow, Garrett & Dunner, L.L.P.

(57) ABSTRACT

A tire includes at least one structural element which includes at least one reinforcing element, which includes at least one hybrid yarn, the at least one hybrid yarn including a plurality of filaments obtained from at least one first multifilament yarn having a first initial tangent modulus and at least one second multifilament yarn having a second initial tangent modulus, the first and the second initial tangent modulus being different from each other, each one of the first and the second multifilament yarns including a plurality of individual filaments, the individual filaments of each one of the first and the second multifilament yarns being at least partially intermixed with each other. Preferably, the tire is a high performance or ultra high performance tire, or a tire suitable for being employed in sporting contests, such as, track motor races, or a tire suitable for sports utility vehicles.

35 Claims, 6 Drawing Sheets

(56) References Cited

U.S. PATENT DOCUMENTS

| | | |
|---|---|---|
| 5,558,144 A | 9/1996 | Nakayasu et al. |
| 5,688,594 A | 11/1997 | Lichscheidt et al. |
| 6,601,378 B1 | 8/2003 | Fritsch et al. |
| 2004/0221937 A1 | 11/2004 | Dehnert et al. |
| 2004/0265581 A1 | 12/2004 | Esnault et al. |
| 2007/0169867 A1 | 7/2007 | Esnault et al. |
| 2007/0181238 A1 | 8/2007 | Ternon et al. |

FOREIGN PATENT DOCUMENTS

| | | | |
|---|---|---|---|
| EP | 0 717 133 A2 | | 6/1996 |
| EP | 1 475 248 A1 | | 11/2004 |
| GB | 1264118 | * | 2/1972 |
| JP | 1-111034 | * | 4/1989 |
| JP | 01-247204 | | 10/1989 |
| JP | 2001-294024 | * | 10/2001 |
| JP | 2004-169237 A | | 6/2004 |
| WO | WO 98/47725 | * | 10/1998 |
| WO | WO 01/18291 A1 | | 3/2001 |
| WO | WO 03/060212 A1 | | 7/2003 |

OTHER PUBLICATIONS

English-language translation of Office Action issued Apr. 23, 2012, in counterpart Japanese Patent Application No. 2010-530277.

* cited by examiner

TIRE HAVING A STRUCTURAL ELEMENT REINFORCED WITH A HYBRID YARN

CROSS REFERENCE TO RELATED APPLICATION

This application is a national phase application based on PCT/EP2007/009221, filed Oct. 24, 2007, the content of which is incorporated herein by reference.

FIELD OF THE INVENTION

This invention relates to a tire having a structural element reinforced with a hybrid yarn.

More in particular, the present invention relates to a high performance tire such as, for example, a tire designed for high-powered cars or, more generally, a tire intended for applications involving high operating speeds and/or extreme driving conditions.

In more detail, the present invention relates to a high performance (HP) or ultra high performance (UHP) tire, as well as to a tire suitable for being employed in sporting contests such as track motor races.

Moreover, the present invention relates to a tire suitable for Sports Utility Vehicles (SUV) which combines the characteristics of comfort and roominess of a station wagon with high performances (especially in terms of high speeds) typical of high-powered cars.

In still more detail, the present invention relates to a tire comprising at least one structural element including at least one reinforcing element comprising at least one hybrid yarn, said at least one hybrid yarn comprising at least one first multifilament yarn having a first initial tangent modulus and at least one second multifilament yarn having a second initial tangent modulus, said first and said second initial tangent modulus being different from each other.

Moreover, the present invention also relates to a hybrid yarn comprising at least one first multifilament yarn having a first initial tangent modulus and at least one second multifilament yarn having a second initial tangent modulus, said first and said second initial tangent modulus being different from each other, as well as to a process to obtain a hybrid yarn.

Furthermore, the present invention also relates to a manufactured rubberized article including at least one reinforcing element comprising at least one hybrid yarn, said at least one hybrid yarn comprising at least one first multifilament yarn having a first initial tangent modulus and at least one second multifilament yarn having a second initial tangent modulus, said first and said second initial tangent modulus being different from each other. Said manufactured rubberized articles may be, for example, tires, structural elements of tires, pipes for high pressure fluids, hoses, conveyors, and the like.

BACKGROUND OF THE INVENTION

High speed running of tires, e.g. higher than 200 km/h generates remarkable centrifugal forces at the tires tread band due to rotation thereof.

Said centrifugal forces cause the tire tread band to swell outwardly resulting in the lifting of the tires tread band in the radial direction. This is known as "lifting phenomenon".

This phenomenon should be suitably controlled and limited as much as possible since it negatively affects the tires behaviour.

For instance, since vehicle electronic systems (e.g. Antilock Braking System (ABS), Electronic Stability Program (ESP), traction distribution on the four driving wheels) are traditionally correlated to the variation of the wheel rolling height and are set to a predetermined range thereof, in the case the lifting phenomenon gives rise to an important swelling of the tire—so that the wheel rolling height falls away from said range—a correct functioning of the abovementioned vehicle electronic systems is no more guaranteed.

Furthermore, in the case the lifting phenomenon is not suitably controlled and limited, an important and different variation of the wheel rolling height may occur in the tires of the same vehicle so that the latter may result to have tires operating differently from each other.

Moreover, in the case the tire deformation due to the lifting phenomenon is considerably high, a plurality of further drawbacks may occur.

For instance, the lifting in the radial direction of the crossed belt layers may arise, especially in correspondence of the axial edges thereof, thereby causing the detachment of the belt layers from the carcass; an uneven wear of the tread band and thus a remarkable decrease of the durability thereof at high speeds may occur; undesired vibrations of the tire resulting in negatively affecting the ride comfort and remarkably increasing the noisiness of the tire at high speeds may be promoted.

In order to at least partially solve the abovementioned drawbacks caused by the lifting phenomenon, a belt layer is generally positioned radially external to the crossed belt layers in order to constrain the latter so as to limit the lifting thereof. Generally, said belt layer is provided with low elastic modulus organic fiber cords, e.g. nylon cords, or high elastic modulus organic fiber cords, e.g. aromatic polyamide cords, which are disposed in a substantially circumferential direction with respect to the equatorial plane of the tire.

However, as known in the art (see, for example, European Patent EP 335,588 below disclosed), the use of low elastic modulus organic fiber cords may not successfully prevent said lifting phenomenon, in particular at very high speed.

On the other end, the use of high elastic modulus organic fiber cords may cause some drawbacks during tire manufacturing. As a matter of fact, when the green tire is mounted in the vulcanization mould and the internal pressure is applied, the essential swelling of the green tire by the internal pressure is reduced. This is because the resistance to stretch of said cords is excessively high and therefore the tire may not correctly expand into the mould to give the necessary force to press the tread band and structure of the tire against the inner face of the tire mould. This often causes defects in the finished tire after vulcanization and moulding. Consequently, the tire high speed performances such as, for example, tire steering stability, and the tire high speed durability, may be negatively affected.

Attempts have been made in the art to overcome the above reported drawbacks.

For example, European Patent EP 335,588 discloses a tire, particularly suitable for high speed passenger cars, comprising a band disposed radially outside the tire belt, said band comprising a ply composed of at least one cord wound spirally and continuously in the circumferential direction of the tyre at 0 to 3 degrees to the equator of the tire. The cord of said ply is a hybrid cord comprising a high elastic modulus yarn and a low elastic modulus yarn twisted together, the hybrid cord having a low elastic modulus in a low elastic modulus zone between zero elongation and a predetermined specific elongation in the range of 2-7% and a high elastic modulus in a high elastic modulus zone above said predetermined specific elongation of the cord. The low and the high elastic moduli change at a transitional point derived from the load elongation curve of the hybrid cord, being the intersecting point of a line orthogonal to the elongation axis passing through the intersection of the tangent to the elongation curve at zero elongation and the tangent to the elongation curve at the break point. The abovementioned tire is said to have improved high speed durability, as well as reduced noisiness.

U.S. Pat. No. 5,558,144 relates to a pneumatic radial tire containing a non-metallic cord breaker belt disposed radially outside a carcass, and a jointless band belt disposed radially outside the breaker belt, said band belt being made of at least one hybrid cord wound spirally and continuously in the circumferential direction of the tire at an angle of 0 to 3 degrees with respect to the tire equator. The hybrid cord includes a low elastic modulus thread and a high elastic modulus thread which are finally-twisted together, said low modulus thread having at least one low modulus fiber, first-twisted and having an elastic modulus of not more than 2000 kgf/mm² and said high modulus thread having at least one high modulus fiber first-twisted and having an elastic modulus of not less than 3000 kgf/mm². In the band belt ply, the count (E) of the hybrid cord per 5 cm width, the stress (F1) in kgf of the hybrid cord at 2% elongation, and the stress (F2) in kgf of the hybrid cord at 6% elongation satisfies the following relationships: F1×E<60; and F2×E>150. The abovementioned tire is said to show the following characteristics: decreasing change of tire diameter, improved durability, improvement of the total tire performance.

United States Patent Application US 2004/0265581 relates to a hybrid cable having a ratio of final tangent modulus vs initial tangent modulus greater than 10. Preferably, said hybrid cable comprises a textile core of an initial modulus of less than 900 cN/tex and a textile wrap of an initial modulus greater than 1300 cN/tex which is wound on said core. A process for obtaining said hybrid cable, as well as a composite fabric usable in a tire incorporating said cable, is also disclosed. Moreover, a tire and a mounted assembly which each incorporates such a composite fabric is also disclosed. The abovementioned hybrid cable is said to be advantageously used in both passenger-vehicle tires and heavy-vehicle tires. It is also said that said hybrid cable allow to improve the endurance at high speed (typically greater than 120 km/h) of the crown reinforcement of tire the hooping crown ply of which is reinforced by these cables.

United States Patent Application US 2004/0221937 relates to a belt bandage for a vehicle pneumatic tire that includes a ply having strength carriers embedded in an unvulcanized rubber mixture. The strength carriers run essentially parallel to one another. Each strength carrier includes a hybrid cord that has a first twisted yarn having a high modulus of elasticity of at least approximately 25000 N/mm² and a second twisted yarn having a low modulus of elasticity which is no greater than approximately 15000 N/mm². The first and second twisted yarns are final-twisted together. A cord count E in cords per 5 cm ply widths, a force F1 at 2% elongation of each hybrid cord, and a force F2 at 6% elongation of each hybrid cord satisfies the following relationships:

$F1 \times E \geq$ approximately 600 N, $F2 \times E >$ approximately 1500 N.

A vehicle pneumatic tire containing said belt bandage is also disclosed. The abovementioned belt bandage is said to ensure a very good high-speed durability of the tire and, in addition, an improved abrasion behaviour of the tire, i.e. a reduced abrasion in particular in the speed range of up approximately 200 km/h, and an increased long-term durability.

U.S. Pat. No. 5,688,594 relates to a hybrid yarn consisting of at least two varieties of filaments, at least one variety (A) having a lower heat shrinkage and at least one variety (B) having a higher heat shrinkage than the rest of the filaments of the hybrid yarn, wherein: the first variety (A) of filaments has a dry heat shrinkage maximum of below 7.5%; the second variety (B) of filaments has a dry heat shrinkage maximum of above 10%, and its dry heat shrinkage tension maximum is so large that the total shrinkage force of the proportion of the second variety of filaments is sufficient to force the lower-shrinking filaments present to undergo crimping; the optionally present, further filament varieties (C) have dry heat shrinkage maxima within the range from 2% to 200%; and at least one of the filament varieties (B) and/or (C) is a thermoplastic filament whose melting point is at least 10° C., preferably 20° C. to 100° C., in particular 30° C. to 70° C., below the melting point of the lower-shrinking component of the hybrid yarn. Also described is a process for producing the hybrid yarn and the use of the hybrid yarn for producing permanent deformation capable textile sheet materials and fiber reinforced shaped articles. No mention is made about use of the abovementioned hybrid yarn in tires.

SUMMARY OF THE INVENTION

The Applicant has faced the problem of providing a tire, in particular a high performance tire, showing both a good overall tire performances such as, for example, steering stability, handling, ride comfort, rolling resistance, in particular during high speed running, and a good tire lifetime.

The Applicant has noticed that hybrid yarns similar to those disclosed in the abovementioned U.S. Pat. No. 5,688,594, may be advantageously used in tires, in particular in case of high performance tires.

More in particular, the Applicant has noticed that the use of said hybrid yarns may allow to obtain tires, in particular high performance tires, showing a good overall performances.

Even more in particular, the Applicant has noticed that the use of said hybrid yarns may allow to prevent the abovementioned lifting phenomenon which may cause a significant variation of the tires dimensions (e.g. width, diameter), as well as a significant variation of the tires footprint area, with a consequent worsening of both the tires performances such as, for example, steering stability, handling, ride comfort, rolling resistance, in particular during high speed running, and of the tires lifetime.

The Applicant has found that the above reported properties may be achieved by providing a tire with at least one structural element including at least one reinforcing element comprising at least one hybrid yarn, said at least one hybrid yarn comprising at least one first multifilament yarn having a first initial tangent modulus and at least one second multifilament yarn having a second initial tangent modulus, said first and said second initial tangent modulus being different from each other.

Moreover, the Applicant has found that the use of said hybrid yarns allows to obtain a correct expansion of the green tire during the tire manufacturing process with a positive effect on the overall performances of the finished tire (i.e. moulded and vulcanized tire).

Furthermore, the Applicant has found that it is possible to obtain hybrid yarns endowed with different properties such as, for example, different transition points, said different properties so allowing their use in different kind of tires, or in different structural elements of said tires.

According to a first aspect, the present invention relates to a tire comprising at least one structural element including at least one reinforcing element comprising at least one hybrid yarn, said at least one hybrid yarn comprising a plurality of filaments obtained from at least one first multifilament yarn having a first initial tangent modulus and at least one second multifilament yarn having a second initial tangent modulus, said first and said second initial tangent modulus being different from each other, each one of said first and said second multifilament yarn comprising a plurality of individual filaments, the individual filaments of each one of said first and said second multifilament yarn being at least partially intermixed with each other.

The fact that the individual filaments of each one of said first and said second multifilament yarn are at least partially intermixed with each other may allow to obtain a hybrid yarn able to maintain its integrity both during the further treatments to which it may be optionally subjected, and during the process for manufacturing the rubberized articles including the same (in particular, during tire manufacturing process).

According to one preferred embodiment, said at least one first multifilament yarn and said at least one second multifilament yarn have a dry heat shrinkage, measured at 177° C. according to ASTM Standard D2259-02 (2004), not higher than or equal to about 10%, preferably not higher than or equal to about 5%.

The use of multifilament yarns having said dry heat shrinkage may allow to obtain a more stable tire structure, both during tire manufacturing process, and during the use of the same, in particular during tire running at high speed.

According to a further embodiment, said at least one structural element includes at least one reinforcing element comprising at least one twisted hybrid yarn.

According to a further embodiment, said at least one structural element includes at least one reinforcing element comprising at least one hybrid cord, said at least one hybrid cord including at least one hybrid yarn and at least one additional reinforcing element made of textile such as, for example, nylon, rayon, polyethylene terephthalate, preferably nylon, or of metal, preferably steel, said at least one hybrid yarn and said at least one additional reinforcing element being twisted together.

According to a further embodiment, said at least one structural element includes at least one reinforcing element comprising at least two hybrid yarns twisted together.

According to a further embodiment, said at least one structural element comprises at least one reinforcing element comprising at least one hybrid yarn and at least one additional reinforcing element made of textile, such as, for example, nylon, rayon, polyethylene terephthalate, preferably nylon.

According to a further embodiment, said at least one structural element comprises at least one reinforcing element comprising at least one hybrid yarn and at least one additional reinforcing element made of metal, preferably steel, more preferably at least one steel cord.

Said reinforcing elements may be disposed along the transversal direction of the structural element according to different arrangement. For example, said reinforcing elements may be disposed in an alternated sequence such as: one reinforcing element according to the present invention (i.e. a hybrid yarn), one additional reinforcing element made of metal or of textile, i.e. 1:1 sequence. Alternatively, said alternated sequence may be the following: two reinforcing elements according to the present invention (i.e. two hybrid yarns), one additional reinforcing elements made of metal or of textile, i.e 2:1 sequence.

According to one embodiment, the tire comprises:
- a carcass structure of a substantially toroidal shape, having opposite lateral edges terminating in respective bead structures;
- a belt structure applied in a radially external position with respect to said carcass structure, said belt structure comprising:
  - at least two belt layers including a plurality of reinforcing elements which are parallel to each other in each layer and intersecting with respect to the adjacent layer, said reinforcing elements being oriented so as to form a predetermined angle with respect to a circumferential direction;
  - at least one additional belt layer applied in a radially external position with respect to said at least two belt layers including a plurality of reinforcing elements, said reinforcing elements being helically wound to form turns oriented in a substantially circumferential direction of the tire;
- a tread band applied in a radially external position with respect to said belt structure;
- a pair of sidewalls applied laterally on opposite sides with respect to said carcass structure.

According to one preferred embodiment, said at least one structural element is said at least one additional belt layer. Said at least one additional belt layer is commonly known as a "0° belt".

According to a further aspect, the present invention also relates to a hybrid yarn comprising a plurality of filaments obtained from at least one first multifilament yarn having a first initial tangent modulus and at least one second multifilament yarn having a second initial tangent modulus, said first and said second initial tangent modulus being different from each other, each one of said first and said second multifilament yarn comprising a plurality of individual filaments, the individual filaments of each one of said first and said second multifilament yarn being at least partially intermixed with each other, said first and said second multifilament yarn having a dry heat shrinkage, measured at 177° C. according to ASTM Standard D2259-02 (2004), not higher than or equal to about 10%, preferably not higher than or equal to about 5%.

According to a further aspect, the present invention also relates to a manufactured rubberized article including at least one reinforcing element comprising at least one hybrid yarn.

According to one preferred embodiment said manufactured rubberized article is a rubberized reinforcing layer. Said rubberized reinforcing layer may be particularly useful in tire manufacturing process.

The present invention, in at least one of the abovementioned aspects, may show one or more of the preferred characteristics hereinafter described.

According to one preferred embodiment, said at least one first multifilament yarn and said at least one second multifilament yarn, comprise a number of individual filaments of from about 50 to about 2000, preferably of from about 100 to about 1000.

According to one preferred embodiment, the individual filaments of said at least one first multifilament yarn and said at least one second multifilament yarn, have a diameter of from about 5 µm to about 100 µm, preferably of from about 10 µm to about 50 µm.

According to one preferred embodiment, said hybrid yarn has a diameter of from about 0.2 mm to about 1.5 mm, preferably of from about 0.3 mm to about 1.0 mm.

According to one preferred embodiment, said at least one first multifilament yarn and said at least one second multifilament yarn, have a linear density of from about 200 dtex to about 4000 dtex, preferably of from about 400 dtex to about 2500 dtex.

Said linear density expressed in dtex is referred to the weight in grams of 10000 m of yarn.

According to one preferred embodiment, said at least one first multifilament yarn has a lower initial tangent modulus and said at least one second multifilament yarn has a higher initial tangent modulus.

According to a further preferred embodiment, said at least one first multifilament yarn has an initial tangent modulus of from about 200 cN/tex to about 1500 cN/tex, preferably of from about 300 cN/tex to about 1200 cN/tex.

According to a further preferred embodiment, said at least one second multifilament yarn has an initial tangent modulus of from about 600 cN/tex to about 8000 cN/tex, preferably of from about 800 cN/tex to about 5000 cN/tex.

According to one preferred embodiment, said hybrid yarn has a transition point of from about 0.5% to about 7%, preferably of from about 1.0% to about 5%.

Said transition point may allow to obtain a desired expansion of the tire structural element, in particular of the tire belt structure, during the tire manufacturing process, as well as to prevent the "lifting phenomena" above reported, in particular when the tire is running at high speeds.

For the aim of the present description and of the claims which follow, the term "initial tangent modulus" means the slope of the tangent to the stress/elongation diagram of said hybrid yarn corresponding to a zero elongation.

For the aim of the present description and of the claims which follow, the term "stress" is expressed as force per unit linear elongation (cN/tex).

For the aim of the present description and of the claims which follow, the term "transition point" means the point of intersection between the tangent to the load/elongation diagram of said hybrid yarn corresponding to a zero elongation and the tangent to the load/elongation diagram of said hybrid yarn for an elongation corresponding to the breaking thereof.

According to one preferred embodiment, said at least one first multifilament yarn and said at least one second multifilament yarn, melt at temperatures not lower than about 200° C.

The use of multifilament yarns which melt at temperatures not lower than about 200° C., may allow to avoid the possible melting of the hybrid yarn, in particular when said hybrid yarn is used in tire manufacturing process.

According to one preferred embodiment, said at least one first multifilament yarn may be selected, for example, from: aliphatic polyamide fibers (i.e. nylon fibers), low initial tangent modulus polyester fibers [e.g., polyethylene terephthalate fibers (PET), polyethylene naphthalate fibers (PEN)], low initial tangent modulus cellulosic fibers (e.g. rayon fibers), or mixtures thereof. Aliphatic polyamide fibers (i.e. nylon fibers), are particularly preferred.

According to one preferred embodiment, said at least one second multifilament yarns may be selected, for example, from: aromatic polyamide fibers (i.e. aramide fibers), high initial tangent modulus polyester fibers [e.g. polyethylene naphthalate fibers (PEN)], polyketone fibers, polyvinylalcohol fibers, high initial tangent modulus cellulosic fibers (e.g. rayon fibers), glass fibers, carbon fibers, or mixtures thereof. Aromatic polyamide fibers (i.e. aramide fibers), are particularly preferred.

According to one preferred embodiment, said hybrid yarn is untwisted, or twisted, preferably twisted. Preferably, the hybrid yarn twist is of from about 50 tpm (turn per meter) to about 600 tpm, more preferably of from about 100 tpm to about 300 tpm.

The twisting of the hybrid yarn may allow to avoid possible problems which may arise during the further treatments of the same (e.g., treatments for improving rubber adhesion, rubber coating processes, etc.), as well as to adjust its transition point in accordance with its final application.

According to one preferred embodiment, said hybrid yarn comprises:
- an amount of from about 10% by weight to about 90% by weight, preferably of from about 30% by weight to about 70% by weight, of the first multifilament yarn;
- an amount of from about 10% by weight to about 90% by weight, preferably of from about 30% by weight to about 70% by weight, of the second multifilament yarn;

said amount being calculated with respect to the total weight of the hybrid yarn.

Said hybrid yarns may be embedded in a crosslinkable elastomeric composition according to well known techniques. Usually, said elastomeric composition comprises elastomeric polymers, as well as other additives such as, for example, fillers (e.g. carbon black, silica), vulcanizing agents (e.g. sulfur), activators, accelerators, plasticizing, used in the tire industry. Examples of elastomeric polymers that may be advantageously used are: natural rubber (NR), epoxidized natural rubber (ENR); homopolymers and copolymers of butadiene, of isoprene or of 2-chlorobutadiene, such as, for example, polybutadiene (BR), polyisoprene (IR), styrene-butadiene (SBR), nitrile-butadiene (NBR), polychloroprene (CR); butyl rubbers (IIR), halogenated butyl rubbers (XIIR); ethylene/propylene copolymers (EPM); ethylene/propylene/non-conjugated diene (such as, for example, norbornene, cyclooctadiene or dicyclo-pentadiene) terpolymers (EPDM); or blends thereof. A person skilled in the art will be capable of determining which elastomeric polymers, as well as which additives, to use, depending on the characteristics of the final manufactured product that it is desired to obtain.

Optionally, in order to improve the adhesion of said hybrid yarn to the elastomeric composition, said hybrid yarn may be surface-treated by dipping it into a solution containing a mixture of resorcinol-formaldehyde resin and a rubber latex (this mixture being commonly denoted by the expression "resorcinol-formaldehyde latex RFL"), and subsequently drying them. The latex used may be selected, for example, from: vinylpyridine/styrene-butadiene (VP/SBR), styrene-butadiene (SBR), latex of natural rubber (NR), carboxylated and hydrogenated acrylonitrile-butadiene (X-HNBR), hydrogenated acrylonitrile (HNBR), acrylonitrile (NBR), ethylene-propylene-diene monomer (EPDM), chlorosulfonated polyethylene (CSM), or a mixture thereof.

Preferably, the tire according to the present invention is suitable for "HP" (High Performance) or "UHP" (Ultra High Performance) tires, i.e. tires capable of sustaining a maximum speed of at least 210 Km/h, preferably over 240 Km/h, even more preferably over 270 Km/h. Example of said tires are those belonging to Classes "H", "V", "W", "Y", "Z", or "ZR".

Moreover, the tire according to the present invention is suitable for Sports Utility Vehicles (SUV) which combines the characteristics of comfort and roominess of a station wagon with high performances (especially in terms of high speeds) typical of high-powered cars.

According to a further aspect, the present invention also relates to a process for manufacturing a hybrid yarn comprising:
- feeding at least one first multifilament yarn having a first initial tangent modulus to an air jet device at a conveying speed higher about 1.0% to about 15%, preferably higher than about 1.5% to about 7.0%, with respect to the take-up speed of the obtained hybrid yarn;
- feeding at least one second multifilament yarn having a second initial tangent modulus to an air jet device at a conveying speed higher than about 1.0% to about 20%, preferably higher than about 5.0% to about 10%, with respect to the take-up speed of the obtained hybrid yarn;

applying an air pressure of from about 3.0 bar to about 10 bar, preferably of from about 3.5 bar to about 8.0 bar, onto said air jet device;

recovering the hybrid yarn so obtained at a take-up speed of from about 20 m/min to about 250 m/min, preferably of from about 50 m/min to about 120 m/min.

According to one preferred embodiment, the conveying speed of said at least one first multifilament yarn is lower than the conveying speed of said at least one second multifilament yarn.

According to a further preferred embodiment, the over delivery (OD %) of said at least one first multifilament yarn is lower than the over delivery (OD %) of said at least one second multifilament yarn.

For the aim of the present description and of the claims which follow, the over delivery (OD %) is represented by the following formula:

$$(OD\%) = [(CS-TS)/TS] \times 100$$

wherein:

CS is the conveying speed of said at least one first multifilament yarn or of said at least one second multifilament yarn to the air jet device;

TS is the take-up speed of said hybrid yarn from the air jet device.

Said air jet device may be selected from devices known in the art such as, for example, air jet texturing device, air tangling jet device, interlacing air jet device.

The differences between the conveying speed of said first and second multifilament yarn, and/or between the over delivery of said first and second multifilament yarn, and/or the different air pressures applied onto said air jet device, may allow to obtain hybrid yarns endowed with different properties such as, for example, different transition points, said properties depending on their final application.

This fact, is particularly useful, for example, for the tire designer which is so able to satisfy its different needs, namely he is able to obtain hybrid yarns with a desired elongation at a specific load in accordance with the specific final application of the same (for example, different structural elements of the tire).

BRIEF DESCRIPTION OF THE DRAWINGS

The features and advantages of the present invention will be made apparent by the following detailed description of some exemplary embodiments thereof, provided merely by way of non-limiting examples, description that will refer to the attached drawings, wherein.

DETAILED DESCRIPTION OF THE PREFERRED EMBODIMENTS

Figure 1:
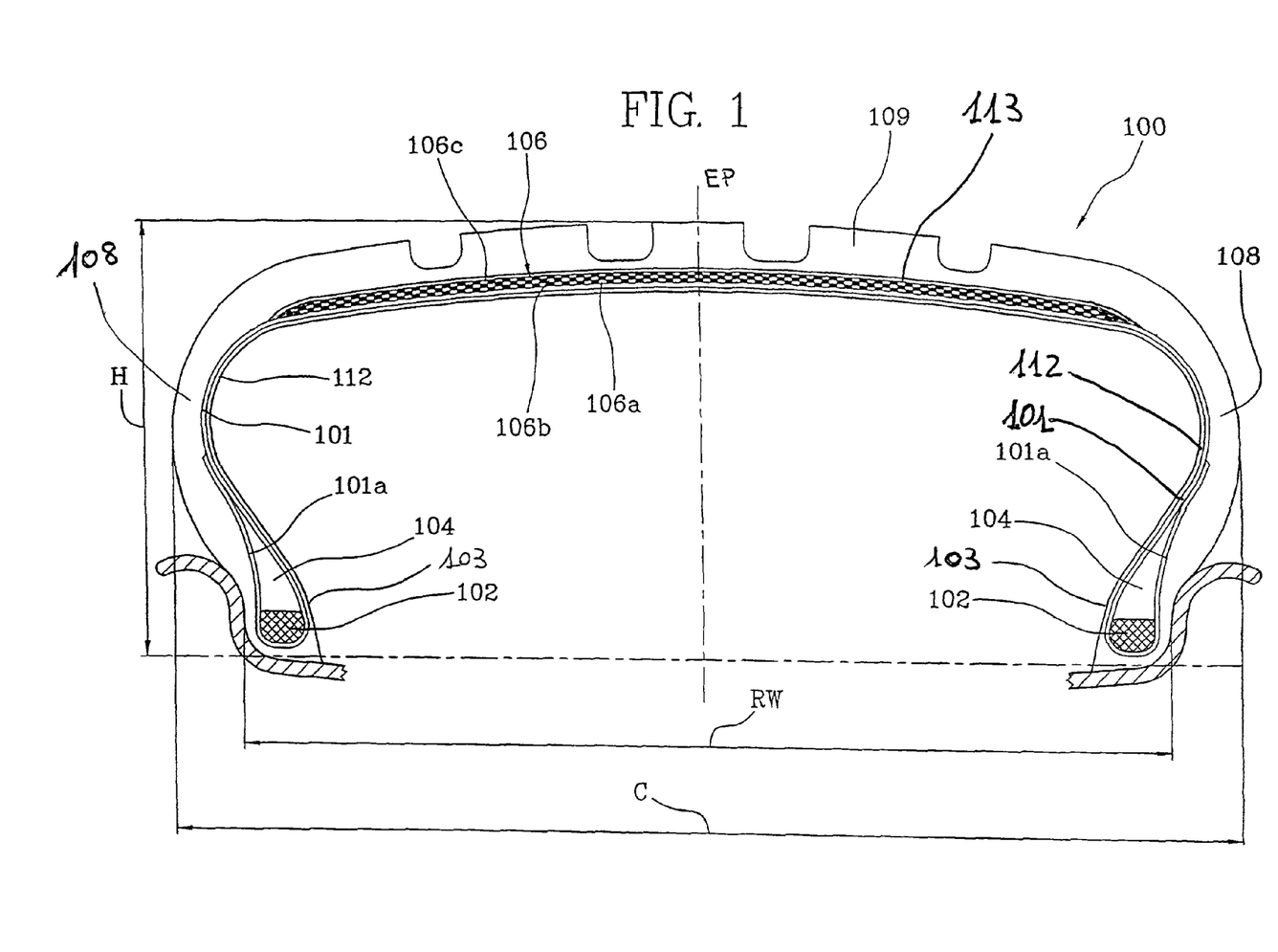
FIG. 1 shows a cross sectional view of a tire according to an embodiment of the present invention.

With respect to FIG. 1 the following definitions are given:

"equatorial plane" (EP) is the plane perpendicular to the tire rotational axis and containing the axial centerline of the tire;

"aspect ratio" is the ratio of the tire cross-section height (H), i.e. the radial distance from the nominal diameter (RW) to the outer diameter of the tire at its equatorial plane, divided by the tire cross-section width (C), i.e. the maximum linear distance parallel to the tire rotation axis between the outer surfaces of the sidewalls (the above dimensions are determined according to the ETRTO Standard (2006), pg. 4-5).

The tire (100) comprises at least one carcass ply (101), the opposite lateral edges of which are associated with respective bead structures (103) comprising at least one bead core (102) and at least one bead filler (104). The association between the carcass ply (101) and the bead core (102) is achieved here by turning-back the opposite lateral edges of the carcass ply (101) around the bead core (102) so as to form the so-called carcass turn-up (101a) as shown in FIG. 1.

Alternatively, the conventional bead core (102) may be replaced with at least one annular insert formed from rubberized wires arranged in concentric coils (not represented in FIG. 1) (see, for example, European Patent Applications EP 928,680 or EP 928,702). In this case, the carcass ply (101) is not turned-up around said annular inserts, the coupling being provided by a second carcass ply (not represented in FIG. 1) applied externally over the first.

The carcass ply (101) generally comprises a plurality of reinforcing elements (hereinafter referred also to as "reinforcing cords") arranged parallel to each other and at least partially coated by means of a crosslinked elastomeric composition. These reinforcing cords are usually made of textile fibers, for example rayon, nylon or polyethylene terephthalate; or of steel wires stranded together, said steel wires being coated with a metal alloy (for example copper/zinc, zinc/manganese, zinc/molybdenum/cobalt alloys, and the like).

The carcass ply (101) is usually of radial type, i.e. it incorporates reinforcing cords arranged in a substantially perpendicular direction relative to a circumferential direction.

The bead core (102) is enclosed in a bead structure (103), defined along an inner circumferential edge of the tire (100), with which the tire engages on a rim forming part of a vehicle wheel. The space defined by each carcass turn-up (101a) contains a bead filler (104) and the bead core (102).

A belt structure (106) is applied in a radially external position with respect to the carcass ply (101). In the particular embodiment of FIG. 1, the belt structure (106) comprises:

two belt layers (106a, 106b) including a plurality of reinforcing cords which are parallel to each other in each layer and intersecting with respect to the adjacent layer, said reinforcing cords being oriented so as to form a predetermined angle with respect to a circumferential direction;

one additional belt layer (106c) applied in a radially external position with respect to said two belt layers (106a, 106b) including a plurality of reinforcing cords, said reinforcing cords being helically wound to form turns oriented in a substantially circumferential direction of the tire.

Usually, the reinforcing cords of said two belt layers (106a, 106b) are made of metal (i.e. are metal cords). As reported above, said reinforcing cords are parallel to each other in each belt layer (106a, 106b) and intersecting with respect to the adjacent belt layer, inclined preferably in a symmetrical manner with respect to the equatorial plane (EP) of the tire (100) at an angle of from about 10° to about 45°, preferably of from about 12° to about 40°, and coated by means of a crosslinked elastomeric composition.

Preferably, the end counts of said reinforcing cords in each belt layer (106a, 106b) is of from about 30 cords/dm to about 160 cords/dm, preferably of from about 50 cords/dm to about 100 cords/dm.

Preferably, said reinforcing cord may have the same end counts along the transversal direction of each belt layer (106a, 106b). Alternatively, the reinforcing cords may have variable end counts along the transversal direction of each belt layer (106a, 106b). For example, the end counts may be greater near the outer edges of each belt layer (106a, 106b) than at a central zone of each belt layer (106a, 106b).

As already reported above, the additional belt layer (106c) is commonly known as a "0° belt". Preferably, the reinforcing cords of said "0° belt" are arranged at an angle of from 0° to about 5° with respect to the equatorial plane (EP) of said tire (100).

Preferably, the reinforcing cords of said "0° belt" (106c) are made of hybrid yarns according to the present invention.

Preferably, the end counts of said hybrid yarns in a cross-section of said "0° belt" (106c) is of from about 50 hybrid yarns/dm to about 150 hybrid yarns/dm, preferably of from about 70 hybrid yarns/dm to about 120 hybrid yarns/dm.

Preferably, said hybrid yarns may have the same end counts along the transversal direction of the "0° belt" (106c). Alternatively, the hybrid yarns may have variable end counts along the transversal direction of the "0° belt" (106c). For example, the end counts may be greater near the outer edges of the "0° belt" (106c) than at a central zone of said "0° belt" (106c).

More than one "0° belt" may be present in the tire (100) (not represented in FIG. 1).

In one preferred embodiment, the reinforcing cords of said "0° belt" (106c) are made of twisted hybrid yarns.

Alternatively, the reinforcing cords of said "0° belt" (106c) are hybrid cords, said hybrid cords being made of at least one hybrid yarn and at least one reinforcing element made of textile such as, for example, nylon, rayon, polyethylene terephthalate, preferably nylon, or of metal, more preferably steel, said at least one hybrid yarn and said at least one additional reinforcing element being twisted together.

Alternatively, the reinforcing cords of said "0° belt" (106c) are made of two hybrid yarns twisted together.

Alternatively, the reinforcing cords of said "0° belt" (106c) include: at least one reinforcing cord made of a hybrid yarn and at least one reinforcing cord made of textile, such as, for example, nylon, rayon, polyethylene terephthalate, preferably nylon.

Alternatively, the reinforcing cords of said "0° belt" (106c) include: at least one reinforcing cord made of a hybrid yarn and at least one reinforcing cord made of metal, preferably steel, more preferably at least one steel cord.

When steel cord are present, preferably, said steel cord are made of steel wires coated with a metal alloy (for example copper/zinc, zinc/manganese, zinc/molybdenum/cobalt alloys, and the like).

Said reinforcing cords may be disposed along the transversal direction of the "0° belt" (106c) according to different arrangement. For example, said reinforcing cords may be disposed in an alternated sequence such as: one reinforcing cord according to the present invention (i.e. a hybrid yarn), one reinforcing cord made of metal or of textile, i.e. 1:1 sequence. Alternatively, said alternated sequence may be the following: two reinforcing cords according to the present invention (i.e. two hybrid yarns), one reinforcing cord made of metal or of textile, i.e 2:1 sequence.

Said "0° belt" (106c) may be obtained by helically winding at least one hybrid yarn around said two belt layers (106a, 106b).

Alternatively, said "0° belt" (106c) may be obtained by helically winding a rubberized reinforcing layer comprising at least one hybrid yarn around said two belt layers (106a, 106b).

A tread band (109) is applied in a radially external position with respect to said belt structure (106). A sidewall (108) is also applied externally onto said carcass ply (101), this sidewall extending, in an axially external position, from the respective bead structure (103) to the edge of the tread band (109).

A tread underlayer (113) may be placed between said belt structure (106) and said tread band (109). In the particular embodiment of FIG. 1, said tread underlayer (113) has uniform thickness. Alternatively, said tread underlayer (113) may have a variable thickness in the transversal direction. For example, the thickness may be greater near its outer edges than at a central zone.

Said tread underlayer usually extends over a surface substantially corresponding to the surface of development of said belt structure (106). Alternatively, said tread underlayer extends only along at least one portion of the development of said belt structure (106), for instance at opposite side portions of said belt structure (106).

A strip made of elastomeric composition, commonly known as a "mini-sidewall", may optionally be present in the connecting zone between the sidewall (108) and the tread band (109) (not represented in FIG. 1), this mini-sidewall generally being obtained by co-extrusion with the tread band and allowing an improvement in the mechanical interaction between the tread band (109) and the sidewalls (108). Alternatively, the end portion of the sidewall (108) directly covers the lateral edge of the tread band (109).

A stiffness of the tire sidewall (108) may be improved by providing the tire bead structure (103) with a reinforcing layer generally known as "flipper" (not represented in FIG. 1).

The flipper is a reinforcing layer which is wound around the respective bead core (102) and bead filler (103) so as to at least partially envelope them, said reinforcing layer being arranged between the carcass ply (101) and the bead structure (103). Usually the flipper is in contact with said carcass ply (101) and said bead structure (103).

The flipper usually comprises a plurality of reinforcing cords that are embedded in a crosslinked elastomeric composition, said reinforcing cords being usually made of textile (e.g. aramide or rayon), or of metal (e.g. steel cord).

The tire bead structure (103) may comprise a further reinforcing layer which is generally known with the term of "chafer" (not represented in FIG. 1) and which has the function of increasing the stiffness of the bead structure (103).

The chafer usually comprises a plurality of reinforcing cords which are embedded in a crosslinked elastomeric composition and which are usually made of textile (e.g. aramide or rayon), or of metal (e.g. steel cord).

Usually, the chafer may be placed in a plurality of positions inside of the tire bead structure (103) and/or sidewall (108). Preferably, the chafer may be placed between the flipper and the carcass ply (101). Alternatively, the chafer may be placed in correspondence of the flipper external leg portion. Alternatively, the chafer may be placed in a position axially external with respect to the carcass ply (101), thus extending in proximity of the flipper external leg portion. Alternatively, the chafer may be placed in a position axially internal with respect to the carcass ply (101), thus extending in proximity of the flipper internal leg portion.

In case the tire is provided with two carcass plies, the chafer may be placed between said carcass plies. Preferably, the chafer may be placed between the carcass plies in proximity of the flipper internal leg portion. Alternatively, the chafer may be placed between the carcass plies in proximity of the flipper external leg portion.

Alternatively, the chafer may be placed in a position axially external with respect to the carcass plies, thus extending in proximity of the flipper external leg portion. Alternatively, the chafer may be placed in a position axially internal with respect to the carcass plies, thus extending in proximity of the flipper internal leg portion.

Usually, the chafer starts in correspondence of the radially external portion of the bead core (102), it follows the perimetral profile of the bead filler (104) and ends in correspondence of the tire sidewall (108). Alternatively, the chafer may extend along the tire sidewall (108), up to the ends of the tire belt structure (106).

In the case of tubeless tires, a rubber layer (112) generally known as a liner, which provides the necessary impermeability to the inflation air of the tire, may also be provided in an inner position relative to the carcass ply (101).

Preferably, the tire (100) according to the present invention has an aspect ratio (H/C), lower than or equal to 0.65, preferably lower than or equal to 0.45, even more preferably lower than or equal to 0.35. Low aspect ratio values are advantageously used in "HP" and "UHP" tires.

The process for producing the tire according to the present invention may be carried out according to techniques and using apparatus that are known in the art, said process including manufacturing the green tire, and subsequently moulding and vulcanizing the green tire.

The present description has been made with a particular reference to the use of the hybrid yarns according to the present invention as reinforcing cords in a tire "0° belt". However, it has to be intended that use of said hybrid yarns as reinforcing elements (possibly, in combination with further yarns or cords) in different tire structural elements may be made.

Figure 3:
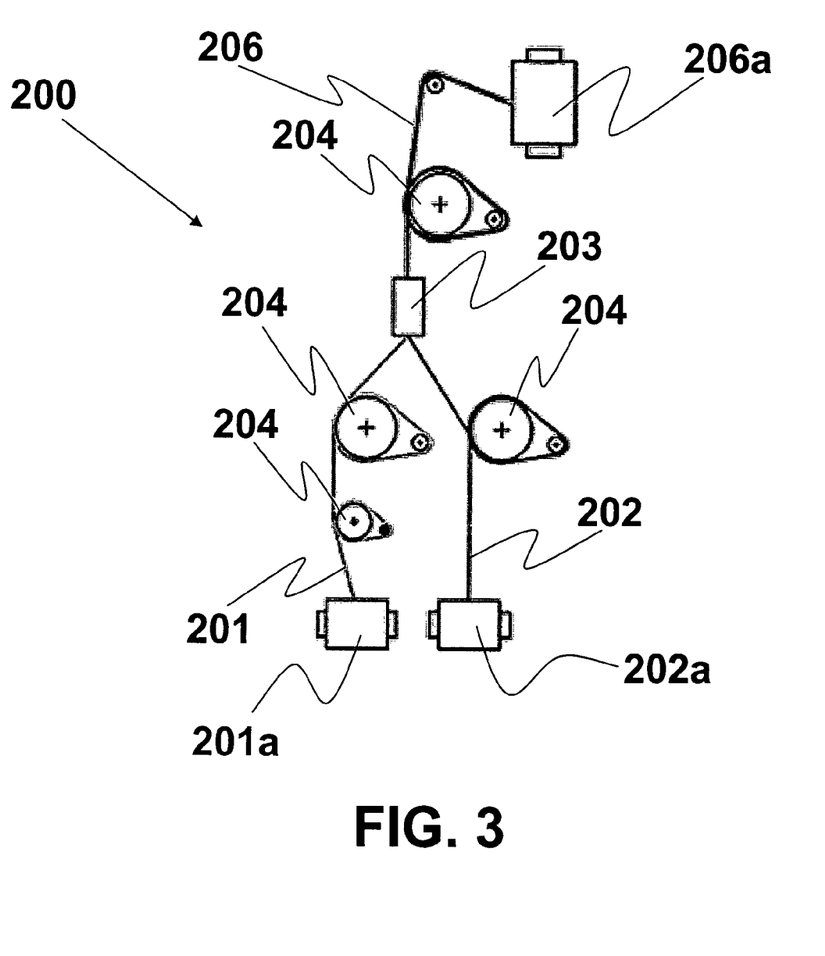
FIG. 3 shows a schematic view of the manufacturing process apparatus according to the present invention.

FIG. 3 shows a schematic view of the manufacturing process apparatus according to the present invention.

The apparatus (200) comprises an air jet device (203) and feeding rollers (204).

A first multifilament yarn (201) including a plurality of individual continuous filaments and a second multifilament yarn (202) including a plurality of individual continuous filaments are unwound from a reel (201a) and (202a), respectively, and are fed, to an air jet device (203) through feed rollers (204).

Said air jet device (203) allow the individual continuous filaments of said first multifilament yarn (201) to at least partially intermix with the individual continuous filaments of said second multifilament yarn (202) to give a hybrid yarn (206).

At the exit from the air jet device (203), the obtained hybrid yarn (206) is made to pass through a feed roller (204) and is subsequently wound onto a reel (206a).

Preferably the conveying speed of said first multifilament yarn (201) is higher than about 1.0% to about 15%, more preferably higher than about 1.5% to about 7.0%, with respect to the take up speed of the hybrid yarn (206).

Preferably the conveying speed of said second multifilament yarn (202) is higher than about 1.0% to about 20%, more preferably higher than about 5.0% to about 10%, with respect to the take up speed of the hybrid yarn (206).

Preferably the conveying speed of said first multifilament yarn (201) is lower than the conveying speed of said second multifilament yarn (202).

Preferably the over delivery (OD %) of said first multifilament yarn (201) is lower than the over delivery (OD %) of said second multifilament yarn (202).

Preferably, an air pressure of from about 3.0 bar to about 10 bar, more preferably of from about 3.5 bar to about 8 bar, is applied onto said air jet device (203), through an air opening (not represented in FIG. 3).

Figure 4:
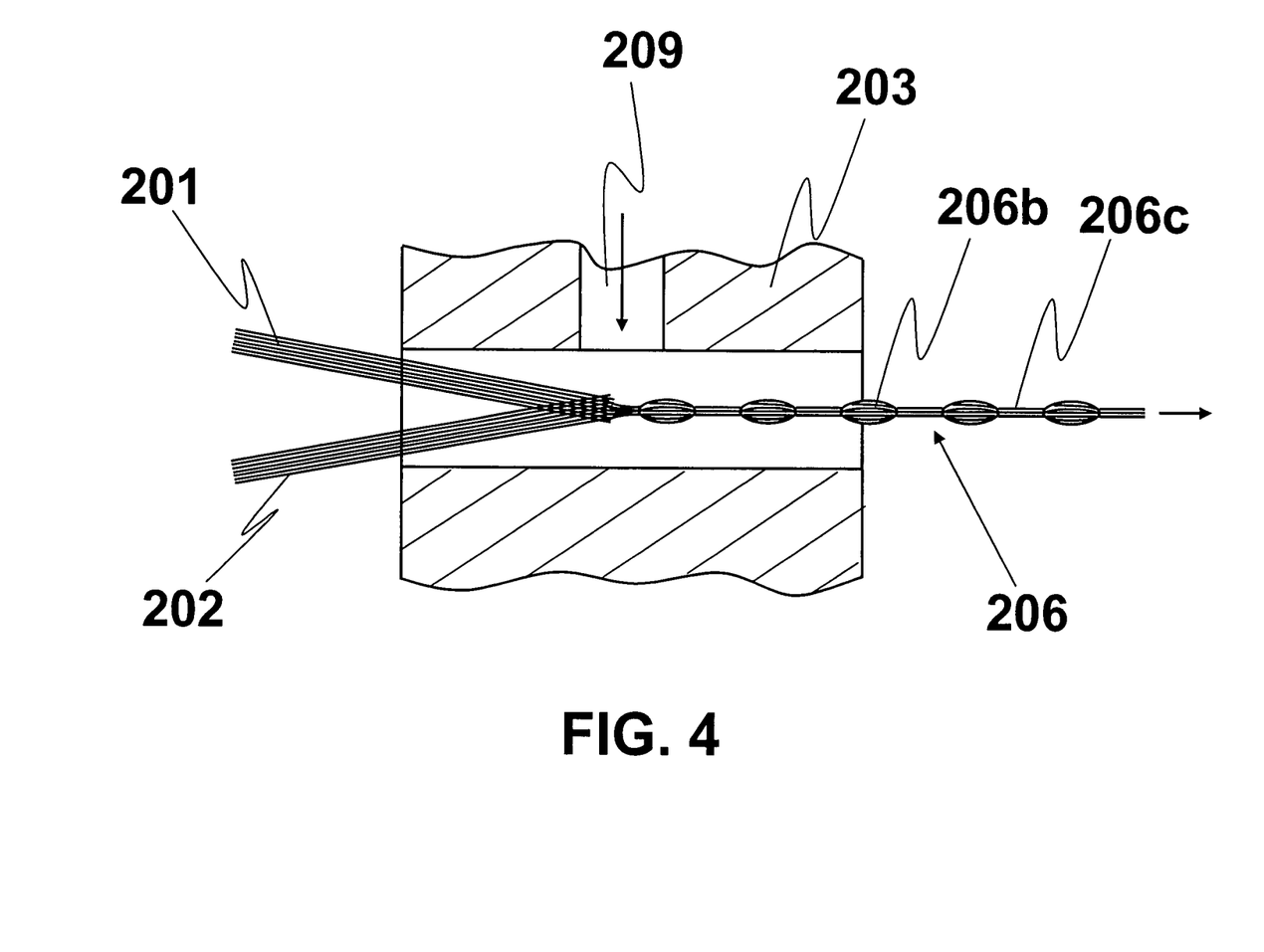
FIG. 4 shows an enlarged schematic view of the air jet device of FIG. 3.

Preferably, the take-up speed of the obtained hybrid yarn (206) from said air jet device (203) is of from about 20 m/min to about 250 m/min, more preferably of from about 50 m/min to about 120 m/min, FIG. 4 shows a schematic enlarged view of the air jet device (203) of FIG. 3 having an air opening (209) (the same reference numbers have the same meanings as above disclosed in FIG. 3).

In particular, FIG. 4 shows the loops (206b) and the substantially straight portions (206c) of the obtained hybrid yarn (206).

The Applicant has noticed that, the first multifilament yarn (201) having a lower conveying speed as well as a lower over delivery (OD %), predominantly forms the substantially straight portions (206c) while, the second multifilament yarn (202) having a higher conveying speed as well as a higher over delivery (OD %), predominantly forms the loops (206b).

Moreover, the Applicant has also noticed that the different amounts and shape of the loops (206b) which, as reported above, may be obtained by varying the conveying speed, and/or the over delivery (OD %), and/or the air pressure onto said air jet device (203), correspond to different transition points of the obtained hybrid yarn (206).

Figure 5:
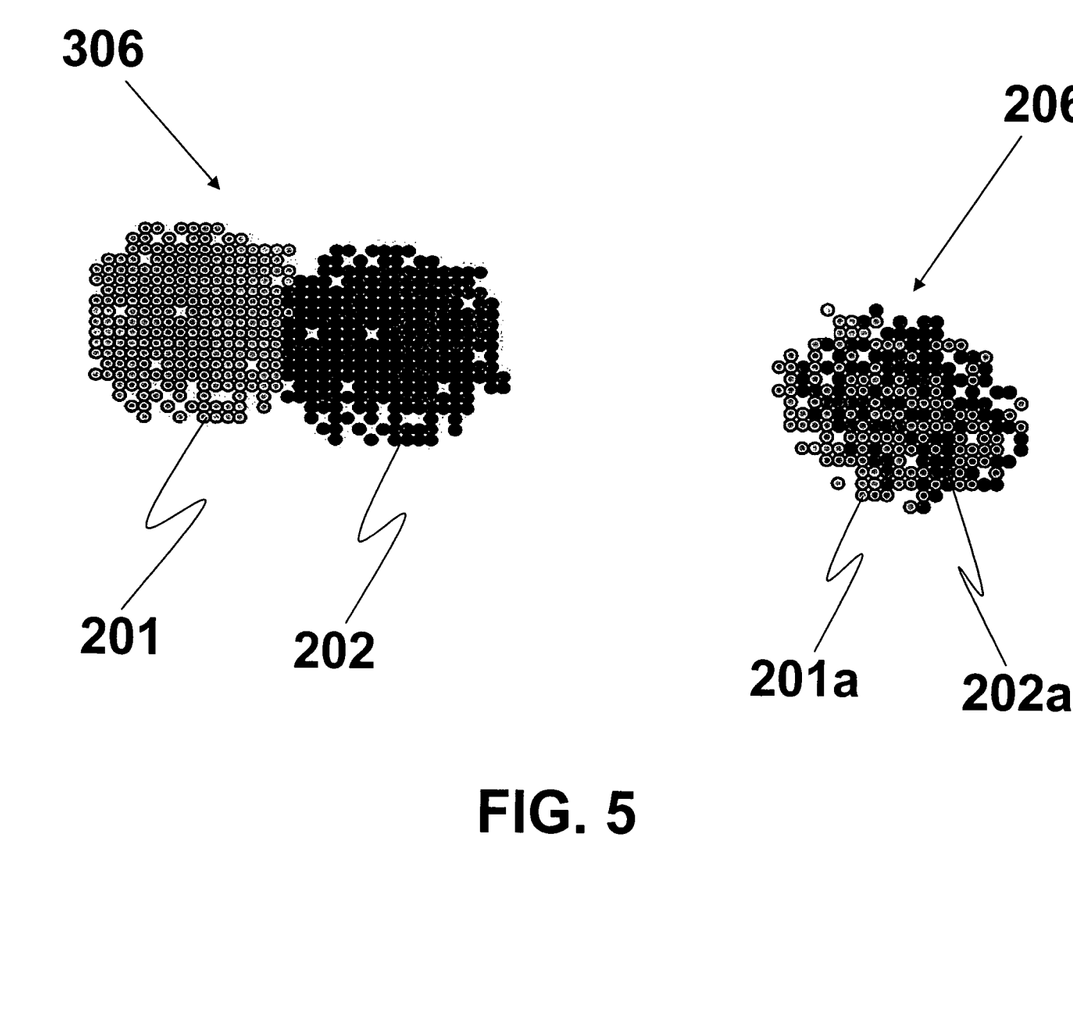
FIG. 5 shows a cross-section of two reinforcing elements: one hybrid yarn according to the present invention; one hybrid cord according to the prior art (comparative)

FIG. 5 shows a cross-section of two reinforcing elements: one hybrid yarn (206) according to the present invention; one hybrid cord (306) according to the prior art.

In particular, the hybrid yarn (206) according to the present invention includes individual continuous filaments (201a) of a first multifilament yarn (201) partially intermixed with the individual continuous filaments (202a) of a second multifilament yarn (202).

The hybrid cord (306a) according to the prior art, includes a first multifilament yarn (201) twisted with a second multifilament yarn (202).

The present invention will be further illustrated below by means of a number of illustrative embodiments, which are given for purely indicative purposes and without any limitation of this invention.

EXAMPLE 1

The following two reinforcing elements were manufactured:
reinforcing element A (hybrid yarn): AR/NY1670/1400 (130 tpm);
reinforcing element B (non-hybrid yarn): NY 1400/1 (150 tpm)
wherein:
reinforcing element A—which represents an embodiment according to the present invention—is a hybrid yarn made of one aramide multifilament yarn (AR) and one nylon multifilament yarn (NY); 1670 is the count (in dTex) of the aramide multifilament yarn and 1400 is the count (in dTex) of the nylon multifilament yarn; 130 tpm (torsion per meter) indicates the hybrid yarn twist;
reinforcing element B—which is a comparative reinforcing element—is made of one nylon multifilament yarn (NY); 1400 is the count (in dTex) of the nylon multifilament yarn; 150 tpm (torsion per meter) indicates the nylon multifilament yarn twist.

The reinforcing element A was obtained by feeding a nylon multifilament yarn and an aramide multifilament yarn to an air jet texturing device operating at the following conditions:

conveying speed of NY: 102 m/min;
conveying speed of AR: 106 m/min;
air pressure: 4 bar;
take-up speed: 100 m/min
over delivery (OD %) of NY: 2%;
over delivery (OD %) of AR: 6%.

Figure 2:
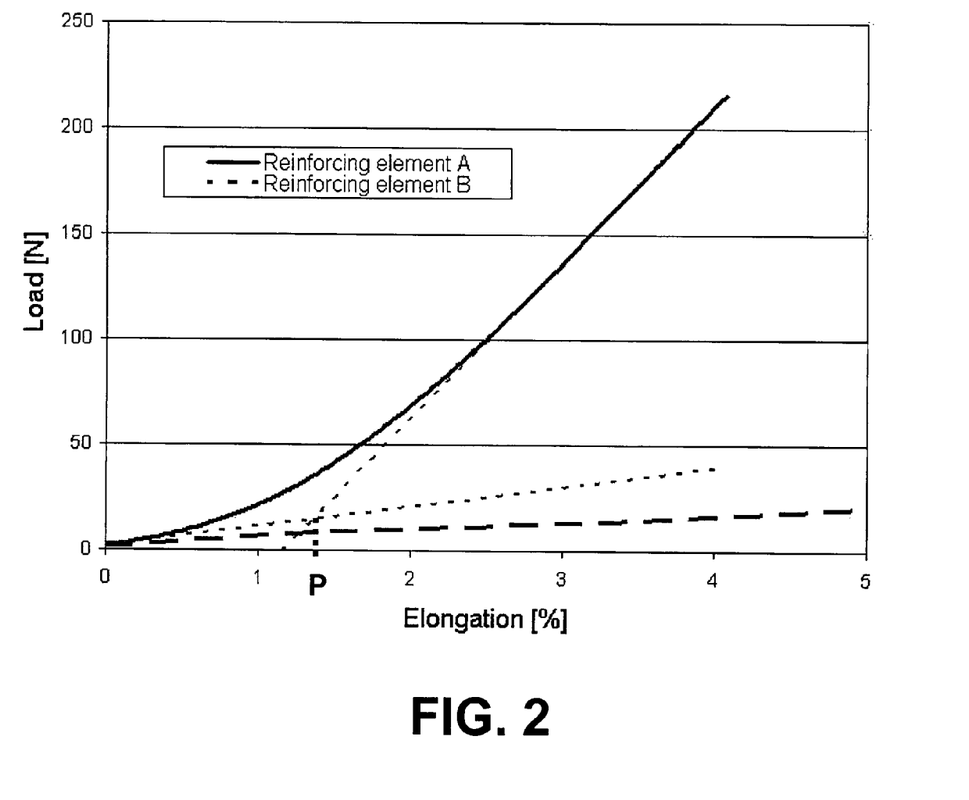
FIG. 2 shows the load/elongation diagram of two reinforcing elements: one hybrid yarn according to one embodiment of the present invention; one non-hybrid yarn (comparative)

FIG. 2 shows the load/elongation diagram—wherein the abscissa indicates the elongation (in percentage) which is given to the reinforcing element A (according to the present invention) and to the reinforcing element B (comparative) and the ordinate indicates the load (in N) which is obtained from said elongation.

FIG. 2 shows that:

the reinforcing element A has a transition point of 1.4%, an initial tangent modulus of 280 cN/tex, a final tangent modulus of 2250 cN/tex;

the reinforcing element B has an initial tangent modulus of 380 cN/tex and does not shows any transition point.

EXAMPLE 2

Finite element analysis (FEA) was used for simulating tires having size 225/50 R17.

The FEA was carried out by comparing tires 1-3 having identical structural elements (e.g. identical carcass, crossed belt layers, bead cores, tread band) but different "0° belt". In particular:

Tire 1: "0° belt" made of two superimposed layers wherein 100% of the reinforcing elements embedded in the elastomeric composition were reinforcing elements B; the end counts of the reinforcing elements was 110 cords/dm; the thickness of each layer was 0.75 mm; the reinforcing elements of each layer being parallel to each other and to the circumferential direction of the tire;

Tire 2: "0° belt" made of one layer wherein 100% of the reinforcing elements embedded in the elastomeric composition were reinforcing elements A; the end counts of the reinforcing elements was 79 cords/dm; the thickness of the layer was 0.90 mm; the reinforcing elements of the layer being parallel to each other and to the circumferential direction of the tire;

Tire 3: "0° belt" made of one layer wherein 50% of the reinforcing elements embedded in the elastomeric composition were reinforcing elements A and 50% were reinforcing elements B; alternated sequence 1:1, the end counts of the reinforcing elements was 79 cords/dm; the thickness of the layer was 0.90 mm; the reinforcing elements of the layer being parallel to each other and to the circumferential direction of the tire.

The FEA was carried by imposing the following conditions:

inflation pressure: 2.2 bar pressure;
"0° belt": 3% pre-loaded;
vertical load: 530 kg.

The obtained results were given in the following Tables 1-3.

TABLE 1

| INFLATED PROFILE[1] | Tire 1* | Tire 2 | Tire 3 |
|---|---|---|---|
| Width (mm) | 240.9 | 241.9 (+0.4%) | 240.6 (−0.1%) |
| R (mm) | 329.0 | 328.2 (−0.28%) | 328.4 (−0.2%) |

[1]vertical load not applied;
*comparative.

From the results summarized in Table 1 it may be pointed out that the tires according to the present invention (Tire 2 and Tire 3) exhibit a limited tire growth with respect to the comparative tire (Tire 1). Moreover it may be pointed out that the tires 1-3 have similar inflated profile.

TABLE 2

| UNDER FOOTPRINT[2] | Tire 1* | Tire 2 | Tire 3 |
|---|---|---|---|
| Width (mm) | 252.1 | 252.6 (+0.4%) | 252.4 (+0.3%) |
| Vertical deflection (mm) | 22.9 | 22.4 (−6.4%) | 22.0 (−3.8%) |

[2]vertical load applied;
*comparative.

From the results summarized in Table 2 it may be pointed out that the tires according to the present invention (Tire 2 and Tire 3) exhibit a lower tire vertical deflection with respect to the comparative tire (Tire 1). Moreover, it may be pointed out that tires 1-3 have similar width.

TABLE 3

| FOOTPRINT DIMENSIONS[2] | Tire 1* | Tire 2 | Tire 3 |
|---|---|---|---|
| Length (mm) | 137 | 145 (+5.8%) | 145 (+5.8%) |
| Width (mm) | 178 | 175 (−1.7%) | 178 |
| Area (mm$^2$) | 15937 | 15446 (−3.1%) | 15703 (−1.5%) |

[2]vertical load applied;
*comparative.

Figure 6:
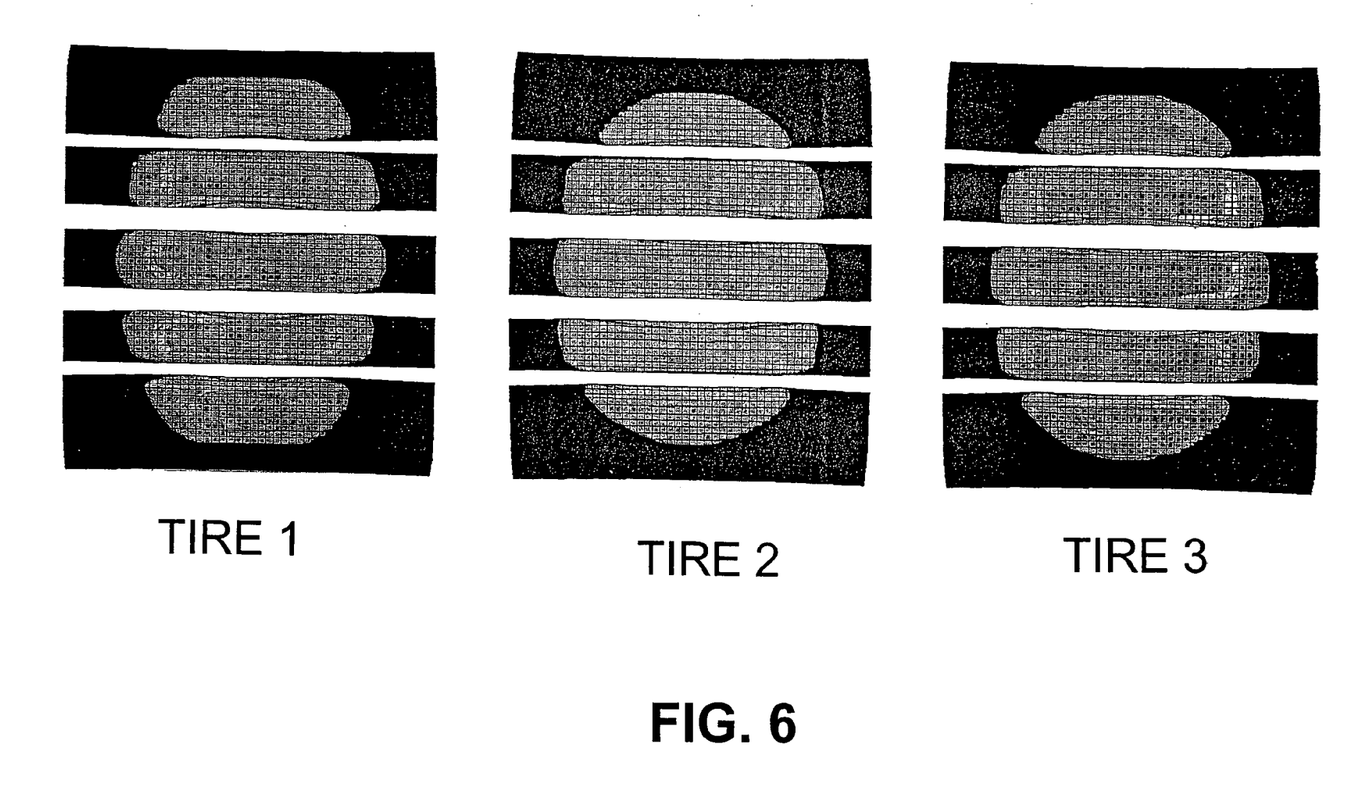
FIG. 6 shows foot print areas of three different tires: Tire 1 (comparative); Tire 2 according to one embodiment of the present invention; Tire 3 according to a further embodiment of the present invention.

From the results summarized in Table 3 and disclosed in FIG. 6, it may be pointed out that the tires according to the present invention (Tire 2 and Tire 3) exhibit a more rounded footprint with respect to the comparative tire (Tire 1).

Moreover, it has been found that the tires according to the present invention (Tire 2 and Tire 3) exhibit a more uniform pressure distribution with respect to the comparative tire (Tire 1).

EXAMPLE 3

Finite element analysis (FEA) was used for simulating tires having size 285/30 R18, both in static and dynamic conditions.

The FEA was carried out by comparing tires 4-5 having identical structural elements (e.g. identical carcass, crossed belt layers, bead cores, tread band) but different "0° belt". In particular:

Tire 4: 0° belt made of two superimposed layers wherein 100% of the reinforcing elements embedded in the elastomeric composition were reinforcing elements B; the end counts of the reinforcing elements was 110 cords/dm; the thickness of each layer was 0.75 mm; the reinforcing elements of each layer being parallel to each other and to the circumferential direction of the tire;

Tire 5: 0° belt made of one layer wherein 100% of the reinforcing elements embedded in the elastomeric composition were reinforcing elements A; the end counts of the reinforcing elements was 79 cords/dm; the thickness of the layer was 0.90 mm; the reinforcing elements of the layer being parallel to each other and to the circumferential direction of the tire.

The FEA was carried out by imposing the following conditions:

- static inflation pressure: 3.0 bar pressure; (STATIC CONDITIONS)
- 300 km/h inflation pressure: 3.6 bar; (DYNAMIC CONDITIONS)
- "0° belt": 3% pre-loaded.

The obtained results were given in the following Table 4.

TABLE 4

| INFLATED PROFILE[1] | Tire 4* | Tire 5 |
|---|---|---|
| STATIC CONDITIONS | | |
| Width (mm) | 297.8 | 297.7 (0%) |
| R (mm) | 318.3 | 318.3 (0%) |
| DYNAMIC CONDITIONS | | |
| Width (mm) | 285.9 | 289.5 (+1.3%) |
| R (mm) | 325.0 | 323.5 (−0.50%) |

[1]vertical load not applied;
*comparative.

From the results summarized in Table 4 it may be pointed out that:

- the tire according to the present invention (Tire 5) exhibits the same inflated profile with respect to the comparative tire (Tire 4) under static conditions;
- the tire according to the present invention (Tire 5) exhibits a limited tire growth with respect to the comparative tire (Tire 4) under dynamic conditions.

Consequently, from the above reported results, it may be pointed out that the tire according to the present invention (Tire 5) exhibits a limited lifting phenomenon with respect to the comparative tire (Tire 4).

The invention claimed is:

1. A tire comprising at least one structural element comprising at least one reinforcing element comprising at least one hybrid yarn, said at least one hybrid yarn obtained from at least one first multifilament yarn comprising first filaments having a first initial tangential modulus and at least one second multifilament yarn comprising second filaments having a second initial tangent modulus, wherein said first filaments predominantly form straight portions and said second filaments predominantly form loop portions in said hybrid yarn, said first initial tangent modulus and said second initial tangent modulus being different from each other, each one of said first and second multifilament yarns comprising a plurality of individual filaments, the individual filaments of each one of said first and second multifilament yarns being at least partially intermixed with each other.

2. The tire according to claim 1, wherein said at least one first multifilament yarn and said at least one second multifilament yarn have a dry heat shrinkage, measured at 177° C. according to ASTM Standard D2259-02 (2004), not higher than or equal to about 10%.

3. The tire according to claim 2, wherein said at least one first multifilament yarn and said at least one second multifilament yarn have a dry heat shrinkage, measured at 177° C. according to ASTM Standard D2259-02 (2004), not higher than or equal to about 5%.

4. The tire according to claim 1, wherein said at least one structural element comprises at least one reinforcing element comprising at least one twisted hybrid yarn.

5. The tire according to claim 1, wherein said at least one structural element comprises at least one reinforcing element comprising at least one hybrid cord, said at least one hybrid cord comprising at least one hybrid yarn and at least one additional reinforcing element comprising textile, nylon, rayon, polyethylene terephthalate, or metal, said at least one hybrid yarn and said at least one additional reinforcing element being twisted together.

6. The tire according to claim 1, wherein said at least one structural element comprises at least one reinforcing element comprising at least two hybrid yarns twisted together.

7. The tire according to claim 1, wherein said at least one structural element comprises at least one reinforcing element comprising at least one hybrid yarn and at least one additional reinforcing element comprising textile, nylon, rayon, or polyethylene terephthalate.

8. The tire according to claim 1, wherein said at least one structural element comprises at least one reinforcing element comprising at least one hybrid yarn and at least one additional reinforcing element comprising metal.

9. The tire according to claim 1, comprising:
- a carcass structure comprising a substantially toroidal shape, having opposite lateral edges terminating in respective bead structures;
- a belt structure applied in a radially external position with respect to said carcass structure, said belt structure comprising:
  - at least two belt layers comprising a plurality of reinforcing elements which are parallel to each other in each layer and intersecting with respect to the adjacent layer, said reinforcing elements being oriented so as to form a predetermined angle with respect to a circumferential direction;
  - at least one additional belt layer applied in a radially external position with respect to said at least two belt layers comprising a plurality of reinforcing elements, said reinforcing elements being helically wound to form turns oriented in a substantially circumferential direction of the tire;
- a tread band applied in a radially external position with respect to said belt structure; and
- a pair of sidewalls applied laterally on opposite sides with respect to said carcass structure, wherein said at least one structural element is said at least one additional belt layer.

10. The tire according to claim 1, wherein said at least one first multifilament yarn and said at least one second multifilament yarn, comprise a number of individual filaments of about 50 to about 2000.

11. The tire according to claim 10, wherein said at least one first multifilament yarn and said at least one second multifilament yarn, comprise a number of individual filaments of about 100 to about 1000.

12. The tire according to claim 1, wherein the individual filaments of said at least one first multifilament yarn and said at least one second multifilament yarn, have a diameter of about 5 μm to about 100 μm.

13. The tire according to claim 12, wherein the individual filaments of said at least one first multifilament yarn and said at least one second multifilament yarn, have a diameter of about 10 μm to about 50 μm.

14. The tire according to claim 1, wherein said hybrid yarn has a diameter of about 0.2 mm to about 1.5 mm.

15. The tire according to claim 14, wherein said hybrid yarn has a diameter of about 0.3 mm to about 1.0 mm.

16. The tire according to claim 1, wherein said at least one first multifilament yarn and said at least one second multifilament yarn, have a linear density of about 200 dtex to about 4000 dtex.

17. The tire according to claim 16, wherein said at least one first multifilament yarn and said at least one second multifilament yarn, have a linear density of about 400 dtex to about 2500 dtex.

18. The tire according to claim 1, wherein said at least one first multifilament yarn has a lower initial tangent modulus and said at least one second multifilament yarn has a higher initial tangent modulus.

19. The tire according to claim 1, wherein said at least one first multifilament yarn has an initial tangent modulus of about 200 cN/tex to about 1500 cN/tex.

20. The tire according to claim 19, wherein said at least one first multifilament yarn has an initial tangent modulus of about 300 cN/tex to about 1200 cN/tex.

21. The tire according to claim 1, wherein said at least one second multifilament yarn has an initial tangent modulus of about 600 cN/tex to about 8000 cN/tex.

22. The tire according to claim 21, wherein said at least one second multifilament yarn has an initial tangent modulus of about 800 cN/tex to about 5000 cN/tex.

23. The tire according to claim 1, wherein said hybrid yarn has a transition point of about 0.5% to about 7%.

24. The tire according to claim 23, wherein said hybrid yarn has a transition point of about 1.0% to about 5%.

25. The tire according to claim 1, wherein said at least one first multifilament yarn and said at least one second multifilament yarn, melt at temperatures not lower than about 200° C.

26. The tire according to claim 1, wherein said at least one first multifilament yarn is selected from: aliphatic polyamide fibers, nylon fibers, low initial tangent modulus polyester fibers, low initial tangent modulus cellulosic fibers, or mixtures thereof.

27. The tire according to claim 26, wherein said at least one first multifilament yarn is selected from aliphatic polyamide fibers or nylon fibers.

28. The tire according to claim 1, wherein said at least one second multifilament yarn is selected from: aromatic polyamide fibers, aramide fibers, high initial tangent modulus polyester fibers, polyketone fibers, polyvinylalcohol fibers, high initial tangent modulus cellulosic fibers, glass fibers, carbon fibers, or mixtures thereof.

29. The tire according to claim 28, wherein said at least one second multifilament yarn is selected from aromatic polyamide fibers or aramide fibers.

30. The tire according to claim 1, wherein said hybrid yarn is twisted.

31. The tire according to claim 30, wherein said hybrid yarn is twisted at a twist of about 50 tpm to about 600 tpm.

32. The tire according to claim 1, wherein said hybrid yarn comprises:
  about 10% by weight to about 90% by weight of the first multifilament yarn; and
  about 10% by weight to about 90% by weight of the second multifilament yarn,
said weight being calculated with respect to the total weight of the hybrid yarn.

33. The tire according to claim 32, wherein said hybrid yarn comprises:
  about 30% by weight to about 70% by weight, of the first multifilament yarn; and
  about 30% by weight to about 70% by weight, of the second multifilament yarn,
said weight being calculated with respect to the total weight of the hybrid yarn.

34. A tire comprising at least one structural element including at least one reinforcing element comprising at least one hybrid yarn, said at least one hybrid yarn comprising a plurality of first individual filaments and a plurality of second individual filaments at least partially intermixed with each other;
  wherein the first individual filaments have different tangent modulus with respect to the second individual filaments;
  wherein the first individual filaments predominantly comprise straight portions and the second individual filaments predominantly comprise loop portions.

35. The tire according to claim 34, wherein the first individual filaments have a lower initial tangent modulus and the second individual filaments have a higher initial tangent modulus.

* * * * *